United States Patent

[11] 3,624,482

[72] Inventors Donald O. Ruff
 Anderson;
 William J. Sensing, West Lafayette, both of Ind.
[21] Appl. No. 73,946
[22] Filed Sept. 21, 1970
[45] Patented Nov. 30, 1971
[73] Assignee General Motors Corporation
 Detroit, Mich.

[54] FIELD DISCONNECT AND INDICATOR CIRCUIT FOR A VEHICLE CHARGING SYSTEM
3 Claims, 1 Drawing Fig.
[52] U.S. Cl. .................................................... 320/48,
 322/28, 322/99, 340/249
[51] Int. Cl. .................................................... H02j 7/24
[50] Field of Search ............................................ 322/28, 99;
 320/48, 61; 340/249, 248

[56] References Cited
UNITED STATES PATENTS
| | | | |
|---|---|---|---|
| 3,496,443 | 2/1970 | Snedeker et al. | 320/64 |
| 3,522,482 | 8/1970 | Thompson | 322/28 |
| 3,467,853 | 9/1969 | Harland, Jr. et al. | 322/28 |
| 3,496,447 | 2/1970 | Thompson | 322/28 |
| 3,129,378 | 4/1964 | Raven et al. | 322/28 |
| 3,553,563 | 1/1971 | Kawashima | 320/61 |

Primary Examiner—Gerald Goldberg
Assistant Examiner—John M. Gunther
Attorneys—E. W. Christen, C. R. Meland and Albert F. Duke ABSTRACT: First and second NPN transistors connected by a single conductor to one side of an indicator lamp the other side of which is connected to the output of a vehicle charging system by an ignition switch. Upon closure of the switch, the first transistor is rendered conductive to turn on a PNP transistor which then connects the vehicle battery to the field winding in the alternator of the charging system. When the output of the charging system is below a predetermined value, the second NPN transistor is biased to conduct current through the indicator lamp and also through a diode connected forwardly between the second NPN and ground. The voltage drops through the diode and the second NPN provide sufficient bias to the first NPN to maintain conduction therethrough and in turn through the PNP

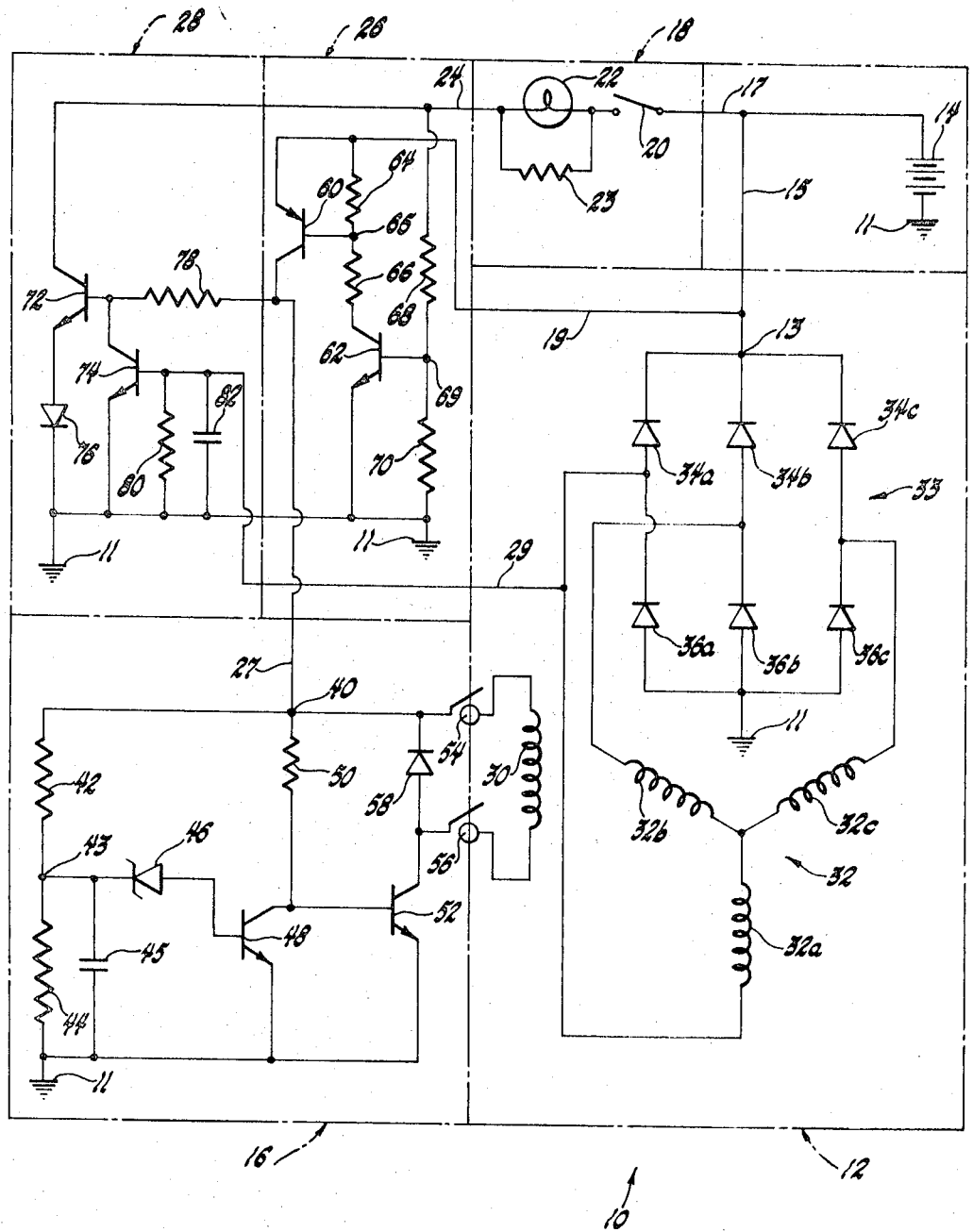

FIELD DISCONNECT AND INDICATOR CIRCUIT FOR A VEHICLE CHARGING SYSTEM

This invention relates to a circuit controlled through the ignition switch of a vehicle and operative to connect potential to both the field winding of an alternator and means controlling an indicator lamp so that the indicator lamp and field may be energized simultaneously.

In order to prevent discharge of the vehicle battery when the vehicle engine is not running, certain loads supplied by the vehicle charging system, such as the indicator lamp, the excitation to the field winding, as well as the means controlling these loads, were heretofore connected to the battery through the ignition switch either directly or under the control of the switch. Those loads that were controlled through the ignition switch such as the indicator and field controls were connected to the switch in parallel. The prior art vehicle charging systems had the means controlling the field excitation path connected in parallel with the indicator lamp and the means controlling its energization and therefore required the installation and expense of a separate conductor from the ignition switch to each of these control means. This expense was material, especially where, as in bus installations, the means controlling the indicator and field path were located remotely from the ignition switch and indicator.

To control the amount of excitation through the field winding in response to the desired output of the charging system, another connection paralleling both the indicator lamp and the field excitation path and their control means was usually made to sense the output of the charging system at the input of the regulator which controlled the field excitation. However, the excitation paths of the prior art systems were usually unsuitable for communicating the output accurately to the input of the regulator since they usually included the ignition switch or relay contacts, semiconductor switches, or diode trios. Voltage drops introduced by these components, for instance through the contacts of the ignition switch or the field relay and through the length of conductors comprising the field path, varied with temperature and age and thereby caused the regulator to sense a voltage different than the output of the charging system.

The indicator and field disconnect circuit of the present invention requires just one common conductor from the ignition switch rather than the two conductors of the prior art. Moreover, the resulting field excitation path may be made so sufficiently short and free from error producing voltage drops that it may also be used for voltage sensing purposes, thereby eliminating a separate sense connection to the regulator.

It is therefore the primary object of the present invention to provide a semiconductor field disconnect and indicator circuit that may be both controlled through a single conductor from the ignition switch of a vehicle.

It is another object to provide a circuit of the foregoing type where the energization of the indicator lamp does not effect the operation of the field disconnect circuit.

It is a further object of the present invention to provide a circuit of the foregoing type where the same path for sensing battery voltage is employed both during startup of the charging system and during its normal operation.

These objects are accomplished in the present invention by a first transistor controlled through the ignition switch and the indicator lamp to control a second transistor connected between the positive terminals of the battery and the field winding of the generator. A third transistor connected in circuit with the ignition switch on the same side of the indicator lamp as the first transistor controls the energization of the indicator lamp in response to conditions in the charging system. A diode connected forwardly between the third transistor and ground provides a voltage drop which when added to that through the third transistor provides a forward bias at the first transistor sufficient to render conduction therethrough.

These and further details of the present invention will become apparent from the following description taken in connection with the drawing wherein the disconnect and indicator circuit of the present invention are shown connected with the typical charging system.

Referring now to the FIGURE, there is shown a charging system 10 one side of which is connected to ground 11 and is comprised generally of an alternator 12, battery 14, and regulator 16. The output of alternator 12 at terminal 13 is connected to the positive terminal of battery 14 by a conductor 15 and is controlled by regulator 16. The output of alternator 12 is also connected by conductor 17 to instrument panel 18 having mounted thereon ignition switch 20 connected in series with indicator lamp 22 shunted by resistor 23 to provide a circuit path should lamp 22 fail. One side of lamp 22 is connected to a terminal of switch 20 and the other side is connected by conductor 24 to both field disconnect circuit 26 and lamp circuit 28. Disconnect circuit 26 is also connected directly to alternator output terminal 13 by conductor 19 and to the input of regulator 16 by conductor 27; and conductor 29 connects alternator 12 to the input of indicator circuit 28.

Alternator 12 may be of known design, here comprised of a rotating field winding 30 that excites stator output windings 32a, 32b, and 32c, one end of each being commonly connected and the other end of each being connected to respective legs of full wave bridge rectifier 33 comprised of positive diodes 34a, 34b, and 34c and negative diodes 36a, 36b, and 36c. The cathodes of positive diodes 34 are connected to alternator output terminal 13. The anodes of negative diodes 36a, 36b, and 36c are connected to ground 11 and the cathodes are connected both to the anodes of diodes 34 and to the respective stator windings 32a, 32b, and 32c.

Regulator 16 may also be of known design, here comprised of input terminal 40, resistors 42, 44, and 50, capacitor 45, Zener diode 46, transistors 48 and 52, and field discharge diode 58. For an excitation applied at input terminal 40, regulator 16 provided an output to field winding 30 through slip ring and brush sets 54 and 56. Connected in series between input terminal 40 and ground 11 are resistors 42 and 44 defining a node 43 therebetween connected to both capacitor 45 connected to ground and the cathode of Zener 46, the anode of which is connected to the base of transistor 48. The collector of transistor 48 and the base of transistor 52 are both connected to input terminal 40 through resistor 50 and both emitters are grounded. Input terminal 40 and the collector of transistor 52 are connected respectively to slip ring and brush sets 54 and 56, the latter also having field discharge diode 58 connected therebetween.

Disconnect circuit 26 is comprised of a PNP transistor 60, an NPN transistor 62, and resistors 64, 66, 68, and 70. The emitter and collector of PNP transistor 60 are respectively connected by conductors 19 and 27 to output terminal 13 of alternator 12 and to input terminal 40 of regulator 16, thereby completing the low impedance path from the output of the alternator to the input of the regulator. Connected in series between conductor 19 and the collector of transistor 62 to bias transistor 60 are resistors 64 and 66 defining a node 65 therebetween connected to the base of transistor 60. And, connected between conductor 24 and ground 11 to bias transistor 62 are resistors 68 and 70 defining a node 69 therebetween connected to the base of transistor 62.

Indicator circuit 28 is comprised of transistors 72 and 74, diode 76, resistors 78 and 80, and capacitor 82. The collector of transistor 72 is connected to conductor 24 and the emitter to the anode of diode 76, the cathode of which is connected to ground 11. The base of transistor 72 is connected through resistor 78 to the collector of transistor 60 in disconnect circuit 26. The collector and emitter of transistor 74 are respectively connected across the base of transistor 72 and ground 11, and the base of transistor 74, biased across parallely connected resistor 80 and capacitor 82, is connected by conductor 29 to one end of stator winding 32a in alternator 12.

OPERATION

Upon the closure of switch 20, transistor 62 of disconnect circuit 26 is biased into conduction from the positive terminal of battery 14 through resistors 68 and 70. At the instant of switch closure, the potential applied to the emitter of transistor 60 and resistor 64 by conductor 19 is the positive terminal voltage of battery 14 via conductor 15. When transistor 62 conducts, this potential is divided across resistor 64 and 66 to bias transistor 60 into conduction, thereby applying the battery potential to input terminal 40 of regulator 16 via conductor 27. The potential at node 43 resulting from the starting (battery) potential applied to input terminal 40 is insufficient to breakdown Zener 46 so that, as will be described shortly, the base of transistor 52 is biased into conduction through resistor 50. This completes a field excitation path through winding 30 starting at the positive terminal of battery 14 through conductors 15 and 19, the emitter to collector junction of transistor 60, conductor 27, terminal 40, slip ring and brush 54, winding 30, slip ring and brush 56, and the collector to emitter junction of transistor 52 to ground 11.

As the output of alternator 12 builds up, the excitation through winding 30 and therefore the potential at regulator input terminal 40 via transistor 60 in disconnect circuit 26 increases from the battery supply voltage during starting and the potential at node 43 of regulator 16 increases accordingly. When the potential at node 43 is sufficient to break down Zener 46 so that transistor 48 conducts, the base of transistor 52 is grounded through the collector to emitter junction of transistor 48, thereby turning off transistor 52 and open circuiting the field excitation path described above. This path is thereafter repetitively opened and closed as the output of the alternator fluctuates about a desired set point, short term fluctuations being filtered by capacitor 45.

Upon the opening of ignition switch 20, the charging system is turned off to disconnect the bias across resistor 68 and 70 to the base of transistor 62. With the conduction through transistor 62 thereby cut off, the base circuit for transistor 60 is opened thereby cutting off transistor 60 and in turn opening the path to field winding 30 therethrough and also preventing discharge of battery 14 while charging system 10 is not operative. Thus, there is only one field excitation path through disconnect circuit 26. This path is the same during the starting of the vehicle charging system as during its normal operation, and also its cutoff. Moreover, the path introduces only the very small and readily compensatable voltage drop of the emitter to collector junction of transistor 60.

Transistor 74 and indicator circuit 28 are representative of means whereby indicator lamp 22 may be energized by the presence of certain conditions in the charging system. Since the present invention is adapted to be used with high gain indicator circuits, another circuit that may be used is that described in U.S. Pat. application Ser. No. 32,850, entitled "Fault Indicator Circuit for Vehicular Battery Charging Systems," filed by Donald O. Ruff on Apr. 24, 1970, and assigned to the same assignee as this application. In the present embodiment, if the output voltage at winding 32a is of a satisfactory value, transistor 74 is rendered conductive, thereby grounding the base of transistor 72 and preventing illumination indicator lamp 22. Nominal current is drawn through resistors 78 under these circumstances due to its high value. However, should the voltage produced at output winding 32a fall below a predetermined value such as during starting, transistor 74 would be cut off and transistor 72 would be biased into conduction by the potential appearing across resistor 78 from the collector of transistor 60. Lamp 22 is then illuminated with the current drawn through ignition switch 20, conductor 24, the collector to emitter junction of transistor 72, and diode 76 to ground 11.

The current through indicator lamp 22 under such conditions is sufficient to energize the lamp. However, the forward drop across the collector to emitter junction of transistor 72 when added to the forward drop across diode 76 is sufficient to render conductor 24 at a potential biasing first transistor 62 and consequently transistor 60 into conduction. Thus, excitation is applied to field winding 30 through disconnect circuit 26 even in the presence of conditions in the charging system causing the energization of indicator light 22. Since the drop through diode 76 once broken down is relatively constant for varying currents, the potential at conductor 24 is therefore independent of the resistance of bulb 22 so that bulbs of different resistances can be used with the same charging system, disconnect circuit and indicator circuit. It follows from this that the function performed by diode 76 could also be performed by a low impedance resistor of resistance which, when coupled with the resistance of a particular bulb 22, provides the necessary potential on conductor 24 to bias transistor 62 into conduction.

It will also be noted that the charging system including disconnect circuit 26 and indicator circuit 28 does not have to be located in proximity to instrument panel 18. Thus, instrument panel 18 may be located remotely from the rest of the charging system and connected thereto by the single conductor 17 connected from the output terminal 13 of alternator 12 and conductor 24 connected from the other side of the ignition switch to disconnect circuit 26 and indicator circuit 28. Moreover, the lengths of conductors 17 and 24 are not critical to the accuracy of the sensing performed by regulator 16 since they are not in the sensing path between alternator 12 and regulator 16. The sensing path includes conductors 19 and 27, the lengths of which may be decreased as desired from output terminal 13 of alternator 12 to eliminate line drops and increase the accuracy of sensing. This may be accomplished for example by merely placing disconnect circuit 26 in close proximity to alternator 12 or even integrating the circuit 26 with that of regulator 16 and placing the combination inside the end housing of alternator 12, as shown in U.S. Pat. No. 3,538,362 to Robert A. Cheetham, et al., entitled "Diode-Rectified Alternating Current Generator Having a Built-In Transistor Voltage Regulator" and assigned to the assignee of the present application.

Having described one embodiment of the present invention, it is understood that the specific terms and examples are employed in a descriptive sense and not for the purpose of limitation. Other embodiments of the invention, modifications thereof, and alternatives thereto may be used. Therefore, we aim in the appended claims to cover such modifications and changes as fall within the true spirit and scope of our invention.

What we claim as new and desire to secure by letters patent of the United States is:

1. In a charging system for a vehicle battery having a positive terminal and a negative terminal the negative terminal being connected to a point of reference potential, an ignition switch one side of which is connected to said positive terminal and the other side of which is connected to an indicator lamp, a plural phase full wave rectifier connected across said battery, an alternating current generator having a plurality of output windings each of which is connected to a different phase of said rectifier, and a field winding; a semiconductor field disconnect and indicator circuit comprising:

a. a first transistor connected to said ignition switch through said indicator lamp and adapted to be rendered conductive upon closure of said switch;

b. a second transistor connected with said first transistor and connected in parallel with said lamp between said positive terminal and said field winding, said second transistor being biased conductive by said first transistor upon closure of said ignition switch;

c. a third transistor responsive to the voltage at said output windings and connected between said indicator lamp and said point of reference potential, said third transistor being biased conductive when said voltage at said output windings is less than a predetermined value and nonconductive when said generator output voltage is above said predetermined value whereby said indicator lamp is energized when said ignition switch is closed and the voltage at said output windings is less than said predetermined value; and d. impedance means connected in series with said third transistor and establishing a voltage drop for maintaining said first transistor conductive during energization of said indicator lamp.

2. In a charging system for a vehicle battery having a positive terminal and a negative terminal the negative terminal being connected to a point of reference potential, an ignition switch one side of which is connected to said positive terminal and the other side of which is connected to an indicator lamp, a plural phase full wave rectifier connected across said battery, an alternating current generator having a plurality of output windings each of which is connected to a different phase of said rectifier, and a field winding; a semiconductor field disconnect and indicator circuit comprising:
  a. a conductor connected to the other side of said indicator lamp;
  b. a first transistor connected to said ignition switch through said indicator lamp and adapted to be rendered conductive upon closure of said switch;
  c. a second transistor connected with said first transistor and connected in parallel with said lamp between said positive terminal and said field winding, said second transistor being biased conductive by said first transistor upon closure of said ignition switch;
  d. a regulator connected to said positive terminal through said second transistor to sense the voltage at said positive terminal and control the current through said field winding in accordance with the sensed voltage;
  e. a third transistor responsive to the voltage at said output windings and connected between said indicator lamp and said point of reference potential, said third transistor being biased conductive when said voltage at said output windings is less than a predetermined value and nonconductive when said generator output voltage is above said predetermined value whereby said indicator lamp is energized when said ignition switch is closed and the voltage at said output windings is less than said predetermined value; and
  f. a unidirectional current conducting device connected in series with said third transistor and establishing a voltage drop for maintaining said first transistor conductive during energization of said indicator lamp.

3. In a charging system for the battery of a vehicle, first and second load conductors connected respectively to the positive and negative terminals of the battery, an ignition switch one side of which is connected to said first load conductor and the other side of which is connected to one side of an indicator lamp, a three phase full-wave rectifier connected to said first and second load conductors, an alternating current generator having a three phase output winding connected to said rectifier, a regulator having an input and an output terminal, a field winding connected to said input and output terminals of said regulator, and an improved indicator and field disconnect circuit comprising:
  a. a first semiconductor switch the control electrode of which is connected to the other side of said indicator lamp and the input and output electrodes of which are connected respectively to said first and second load conductors, said first switch being biased conductive by the closure of said ignition switch;
  b. a second semiconductor switch the control electrode of which is connected to the input electrode of said first semiconductor switch and the input and output electrodes of which are connected respectively to said first load conductor and said input terminal of said regulator, said second switch being biased conductive when said first switch is biased conductive; and
  c. a third semiconductor switch the control electrode of which is connected to said output and the input and output electrodes of which are connected respectively to the other side of said indicator lamp and to said second load conductor, said third switch being biased conductive when said voltage at said output winding is less than a predetermined value and nonconductive when said voltage is above said value, whereby said indicator lamp is energized when said ignition switch is closed and the voltage at said output winding is less than said predetermined value while said first and second semiconductor switches are rendered conductive.

* * * * *

PO-1050
(5/69)

UNITED STATES PATENT OFFICE
CERTIFICATE OF CORRECTION

Patent No. __3,624,482__      Dated __November 30, 1971__

Inventor(s) __Donald O. Ruff et al.__

It is certified that error appears in the above-identified patent and that said Letters Patent are hereby corrected as shown below:

In the Abstract, the last line, after "PNP" insert a period (.). Column 3, line 20, after "accordingly", insert a period (.). Column 6, line 27, after "output" insert -- winding --.

Signed and sealed this 27th day of June 1972.

(SEAL)
Attest:

EDWARD M. FLETCHER, JR.
Attesting Officer

ROBERT GOTTSCHALK
Commissioner of Patents